July 28, 1964    A. L. BERLAD    3,142,159
APPARATUS FOR THE SAFE STORAGE AND HANDLING
OF NORMALLY EXPLOSIVE MATERIALS
Filed June 5, 1961    2 Sheets-Sheet 1

ABRAHAM L. BERLAD
INVENTOR.

BY
ATTORNEYS

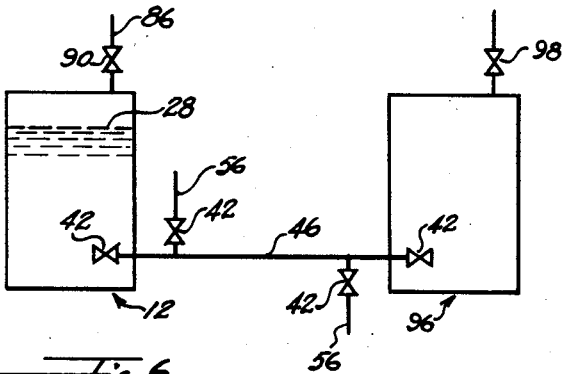
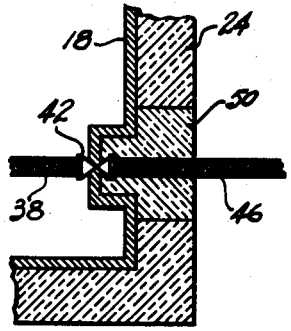
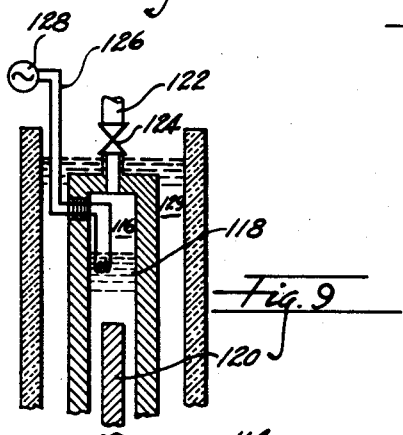
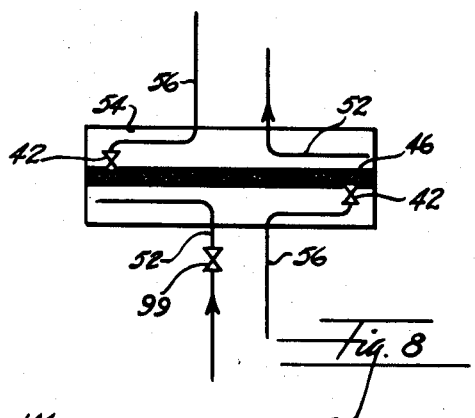
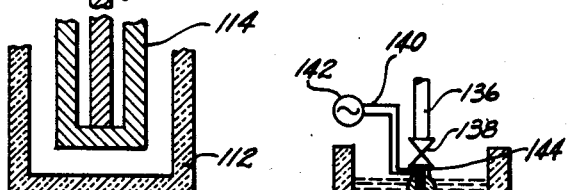
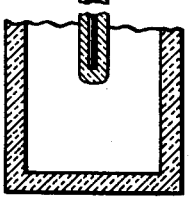

United States Patent Office 3,142,159
Patented July 28, 1964

3,142,159
APPARATUS FOR THE SAFE STORAGE AND HANDLING OF NORMALLY EXPLOSIVE MATERIALS
Abraham Leon Berlad, San Diego, Calif., assignor to General Dynamics Corporation, San Diego, Calif., a corporation of Delaware
Filed June 5, 1961, Ser. No. 115,025
6 Claims. (Cl. 62—48)

This invention relates to an apparatus for the storage and handling of materials, and more particularly to an apparatus for effecting the safe storage and handling of materials in liquid state which are normally of a highly explosive character.

Extremely difficult problems are presented in the transport and storage of normally explosive materials, particularly where large scale commercial handling is contemplated. Often manufacture and use of these materials is limited to the particular sites where their use is contemplated, or they are handled only in highly diluted form to avoid dangers inherent in their transport. This of course precludes in large measure the advantages to be gained from centralization of facilities for producing, storing and distributing such materials to consumers.

The treatment accorded ozone is particularly illustrative. This highly unstable gas has wide commercial application as a germicide and a powerful oxidant, and is widely used commercially in the purification of drinking water, preparation of chemicals, treatment of industrial wastes, deodorization of air and sewage gases, and the preservation of foods in cold storage. However, ozone whether in liquid or gaseous form, when concentrated in an ozone-oxygen mixture above approximately 10% ozone, is normally highly explosive and may be triggered by minute amounts of catalysts or organic matter, shocks, electric sparks, sudden changes in temperature and pressure and the like. As a result of its explosive character, concentrated ozone is not commercially marketed and it is necessary to purchase ozone diluted to a great extent with air or oxygen, or in the alternative, to manufacture the ozone at the site of its use, as by means of an ozonator. However, this latter is a relatively expensive process.

Quite evidently if a suitable system could be worked out for handling large quantities of ozone and other materials of like explosive character, great economies in their manufacture, handling, and storage could be accomplished. Under the teachings of this invention, a suitable method and apparatus are disclosed for making this possible. Ozone has been illustratively mentioned above, inasmuch as it is one of the most highly explosive of materials and one which presently has wide commercial utility, but which can be of vastly extended utility through practice of the teachings of this invention.

It is therefore an object of this invention to provide an apparatus for the safe handling and storage of normally explosive materials.

It is another object of this invention to provide an apparatus for the handling and storage of normally explosive materials, which provide adequate safety even in the presence of externally and internally imposed ignition hazards.

A further object of the invention is to provide an apparatus which permits the safe handling and storage of normally explosive materials in high mass concentrations as liquids without the danger of spontaneous explosion or explosion from internal or external initiating disturbances.

Still another object is to provide apparatus which is relatively simple to construct and which is reliable in its operation, assuring safety in the handling and storage of normally explosive materials.

Other objects and advantages of this invention will become apparent from the following description, when taken in conjunction with the drawings in which:

FIGURE 6 is a schematic showing of an arrangement for transfer of normally explosive material from one container to another.

FIGURE 7 is a cross-sectional view showing in detail a broken away portion of the container of FIGURE 1 and a transfer valve incorporated therein.

FIGURE 8 is a schematic showing of the transfer conduit shown in FIGURE 6.

FIGURES 9 and 10 are vertical cross-sectional views of laboratory test apparatus.

Figures 1, 2:
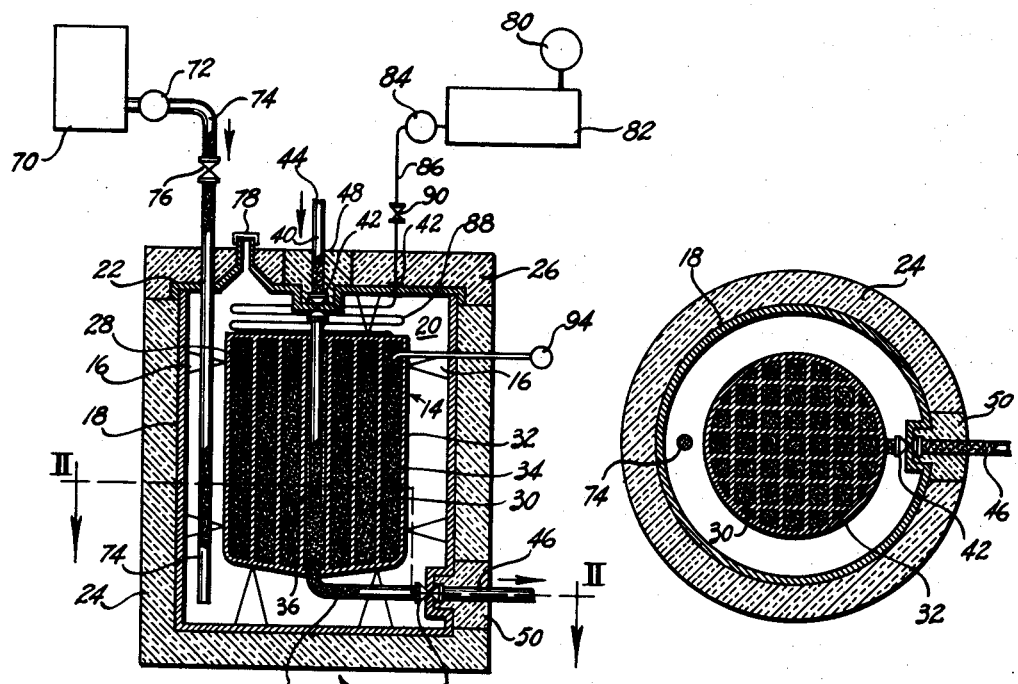
FIGURE 1 is a vertical cross-sectional view of a container constructed in accordance with the teachings of the present invention and schematically showing refrigerating and pressurizing equipment utilized in conjunction therewith.
FIGURE 2 is a horizontal cross-sectional view taken on the line II—II of FIGURE 1.

The term "normally explosive material" as used herein, and of which ozone is typical, is defined as being a material which is made up of one or more chemical constituents which can react exothermically and which may self-ignite and cause an explosion and/or which, when subjected to various ignition sources such as hot surfaces, sparks, shock waves, or other stimuli, may ignite causing an explosion. A partial listing of such substances includes nitroglycerine, methyl nitrate, ethyl nitrate, ozone, hydrocarbon-oxygen mixtures, hydrogen-fluorine mixtures, lithium azide, calcium azide, hydrogen-oxygen mixtures, and hydrocarbon-ozone mixtures.

This invention provides an apparatus whereby the environment of the normally explosive material is carefully controlled at all times. Thus the parameters of temperature, pressure, and the size and shape of the material storage cells are determined in view of the particular normally explosive material involved and the nature and the size of the initiating disturbance or disturbances which must be guarded against. In broad outline, the apparatus of the invention includes one or more heat-insulated containers each having disposed therein a vessel for containing the normally explosive material in a liquid state and a refrigerating compartment embracing said vessel within which is circulated a suitable refrigerant to maintain the normally explosive material at a temperature below critical. The vessel is divided into a number of spaces by a plurality of heat transfer panels arranged in honeycomb fashion and perforated to permit passage of the normally explosive material therethrough. A highly porous material which is non-catalytic and non-reactive with the normally explosive material is packed into the spaces and serves to define interstices or cells for the confinement of the stored material, which cells are of an effective diameter no greater than the quenching distance of the normally explosive material under the temperature and the pressure conditions maintained within the vessel. Cooling and pressurizing means are provided to furnish a suitable environment for the stored material to assure its maintenance in a liquid state. Thus, conduits are provided to communicate between gas pressurizing and refrigerating sources and the inner vessel and the refrigerating chamber, respectively, for controlling the pressure and temperature environment of the normally explosive material stored within the vessel interstices. By providing the heat transfer panels for conducting heat away from each of the explosive material containing interstices, a safe environment is assured not only for those cells proximate to the vessel walls but for the cells which are substantially removed therefrom. In large apparatus this is an extremely important consideration since a highly porous material, as contemplated herein for the makeup of the interstices themselves, in large volume becomes an insulator, thus considerably retarding the transfer of heat from the inner cells outwardly to the refrigerating chamber or heat sink. Provision of heat transfer panels is important notwithstanding that the normally explosive material is stored in the form of a liquid which is many times more effective as a heat conductor than would be a gaseous normally explosive material. Supply and withdrawal conduits similarly providing a safe environment for the explosive material communicate with the interior of the vessel and serve as means for the transfer of the normally explosive material to and from the container. Environmentally controlled transfer conduits communicate with the supply and withdrawal conduits and are provided with specially designed transfer valves for the safe transfer of the normally explosive material to and from the container vessel. The transfer conduits are further provided with flushing lines for removal of any normally explosive materials still in the transfer conduits after transfer completion.

In handling any normally explosive material it is necessary to carefully control the pressure, temperature, and the cell size and shape, together with the container characteristics—all with regard to the particular material involved and the type of initiating disturbance to be guarded against. Thus, a safe system may be arrived at and a regime established within which these parameters may be varied in carefully controlled fashion, subject to limitations hereinafter indicated, to maintain a safe system. It may be erroneously assumed that one or more of the above parameters may be ignored in arriving at this safe system. This is not correct. For example, it cannot be assumed that if the normally explosive material is maintained at a relatively low temperature, chemical reaction of the material may be prevented since chemical reaction rates are non-zero for all temperatures above absolute zero. Thus a temperature which is low, but above absolute zero, by itself does not assure safe storage. As a result, there does exist at such temperatures some reaction rate, i.e., heat release, which must be dealt with in order that the attendant danger of spontaneous explosion, independent of any external initiating distrubance, may be eliminated. To this end, cells of finite size together with heat conductive members are provided herein to effect the transfer of heat from the normally explosive member to a heat reservoir.

It is important to note that chemical reaction rates are finite, no matter how high. From the Conservation of Energy law, it may therefore be reasoned that a sufficiently small, i.e., non-zero cell size may be determined for a given set of parameters which will permit heat transfer to the cell walls at a sufficient rate to prevent a running away of the reaction and a consequent explosion. All chemically reactive systems are non-adiabatic and non-isothermal. Thus, for an initially isothermal system, the chemical heat release, which may exist regardless of whether or not the system is safe, always causes a flow of heat to the walls of the containing structure. The system containing the normally explosive material will be stable and present no danger of explosion if the heat flow to the walls just balances the heat generated in the medium and provides additional capacity sufficient to handle the increased reaction rate resulting from initiating disturbances. Heat flow to the cell walls varies directly in accordance with the thermal conductivity of the material and with the difference between the temperature of the cell walls and the mean temperature of the cell cross section. Such flow further varies inversely as the square of the inside diameter of the cell. The advantages offered by the apparatus of this invention in effectively dissipating the heat within the stored material to the cell walls and thence to the vessel walls will presently become apparent.

From everyday observation, it is apparent that safe systems exist even though heat release rates are non-zero. In contrast, unsafe systems exist even for cases where heat release rates prior to explosion are very small. It is therefore apparent that chemical reaction rates (heat release rates) are not alone determinative of safe or unsafe conditions. Rather, these rates at a particular spatial point are dependent upon pressure, temperature, and the composition of the normally explosive material involved. None of the parameters may be ignored and the success of the present invention results from careful observation and control of each.

It is known that a normally explosive material such as ozone may be safely stored as a gas at relatively low pressures. Patent No. 2,928,529 describes a method and apparatus by which this may be accomplished. However, the work heretofore done in this area readily leads to the erroneous conclusion that storage of a normally explosive material under pressures sufficiently high to achieve the liquid state necessitates use of storage cells whose quenching distance is virtually of atomic size and hence totally impracticable. This erroneous reasoning proceeds somewhat as follows. For gaseous normally explosive materials a no-explosion condition may be obtained at a very low pressure with given values of temperatures, cell size and shape, and a particular ignition source strength. This condition for fixed values of the other parameters defines a pressure above which an explosion will occur and below which an explosion will not occur. For pressures higher than the no-explosion pressure, the violence of explosion, i.e., the energy release and the energy release rate per unit volume, becomes greater the higher the pressure. By extrapolation the conclusion is then reached that higher initial pressures will produce an unsafe condition. As established by this invention, however, this is clearly not the case and a safe thoroughly reliable method and apparatus for storing the normally explosive material in liquid form and at high pressures is herein disclosed.

In the discussions which follow, high concentrations of ozone will be used to illustrate the handling of normally explosive material in accord with the practices of the invention. However, the invention is of course not to be construed as limited to particular concentrations of ozone nor to the substance itself. The actual values of the parameters involved will of course differ for various materials; however, the techniques employed together with the apparatus will be similar.

It is necessary that the problem of establishing safe conditions for material handling be considered both from the standpoint of preventing a spontaneous explosion from within the material and from the standpoint of providing adequate protection against initiating disturbances. As previously pointed out, it is important to provide for the dissipation of internally generated heat, preferably to some type of heat sink. Herein this is accomplished by providing cooled walls for the container in which the normally explosive material is confined and to which the heat from the cells is conducted by the heat transfer panels. The second and somewhat more difficult task is to provide conditions which assure that initiating disturbances of a given size will not lead to an explosive reaction. If the problem raised by initiating disturbances is satisfactorily solved, it follows that there will be no problem from spontaneous explosions from within the material. The reverse, however, is not true. Therefore it is necessary to create conditions such that a given initiating disturbance will be caused to decay (with time) rather than grow into an explosion.

It is further desirable that conditions be provided such that a fully developed steady state deflagration, or flame will decay with time. This latter is the most difficult case encountered. Such disturbance must not, however, be of a magnitude sufficient to essentially change the temperature and pressure conditions of a large part of the system itself for it is necessary that the normally explosive material be maintained as a liquid during storage and handling. It is therefore apparent that in connection with the utilization of the apparatus and method of this invention a determination should be made as to the size of the initiating disturbance to be guarded against and a factor of safety preferably incorporated in determining the specifics of design. This is of course consistent with current practice in the handling of explosives under safety regulations prescribed by the Interstate Commerce Commission and other regulatory bodies.

As heretofore indicated, it is a well known fact that gaseous ozone may be safely handled in high percentage concentrations at low pressures. Thus, at a temperature of about 300° K., 100% ozone, i.e., with substantially no impurities, may be stored at 5.0 mm. Hg between plane parallel plates spaced at 0.5 inches. An increase in pressure will require a smaller cell size for safe storage, whereas with lower percentage concentrations, as where gaseous ozone is mixed with oxygen or some other inert, the gaseous ozone mixture can be safely stored at 300° K. at higher pressures and in larger cells. For example, a concentration of 3% ozone is safe at atmospheric pressure in cells which are several inches in size.

However, as is pointed up herein, a number of advantages are to be gained by storing and handling the normally explosive material in large mass concentrations, preferably as a liquid at high pressure, rather than as a liquid at low pressure or as a gas at high pressure. It becomes particularly important to store the normally explosive material as a liquid at high pressure where it is contemplated that the storage temperature will be maintained in the close vicinity of the critical temperature for the normally explosive material, for it is important that such material not change from the liquid to the gaseous phase responsive to either internal heat accumulation and/or external or internal perturbation. An appropriately high pressure will assure that the normally explosive material is maintained as a liquid. Temperature control is facilitated with high pressure liquid storage since a given mass of normally explosive material can be confined in a reduced volume. Transfer at rates substantially greater than those available in the case of low pressure gas are available with liquid ozone stored under high pressure. Further, a liquid stored under high pressure may be easily transferred to a neighboring unit while maintaining by external inert gas pressurization, the original pressure in the initial container and the somewhat lower, but still high, pressure in the neighboring unit.

The high pressure liquid system of this invention is easier to make safe than a high pressure gaseous system. It should be pointed out that a deflagration-detonation can be extinguished in very small relatively cold tubes in the case of liquid at high pressure and of a gas at high pressure. The reason for this extinction phenomenon is the loss of energy by convection, conduction, radiation, and of momentum by viscous losses. Such losses prevent satisfaction of the energy-momentum-conservation equations—equations which must be satisfied if the destructive phenomenon is to exist. In the case of the highly pressurized liquid, however, prevention of the deflagration-detonation is easier to achieve and the system is inherently much safer than is the case for the highly pressurized gas. An initiating disturbance of a given size occurring in the gas phase of each of the two systems will cause considerable reaction and possibly initiation of an explosion in a gas system; whereas no such reaction will occur in a liquid system. In the case of the liquid system, the inert gas utilized as a pressurizing medium can be chosen for its high thermal conductivity, thereby permitting rapid dissipation of the disturbance. Helium is a suitable gas for such use. Further, an initiating disturbance of a given size will cause less reaction in the high pressure liquid system than in the high pressure gaseous system, for some of the energy in the liquid system must go toward raising the temperature of the liquid and vaporizing it such that the gas-phase reaction may proceed. Heat dissipation to the walls is considerably more effective in the case of the liquid than in the case of the gas, inasmuch as the thermal conductivity of the liquid is in the vicinity of from 10 to 100 times that of the corresponding gas. Heat dissipation to walls and consequent extinction is therefore more easily accomplished for liquids than for gases. The viscosity of liquids is generally much greater than the viscosity of gases, or can be made so. This assures larger momentum dissipation per unit volume to the cell walls of the liquid system than to the walls of the gas system.

Assuming that the initiating disturbance to be guarded against is of a size equal to that of an adiabatic deflagration or detonation, the thermal conductivity, heat capacity per unit volume, viscosity and latent heat of boiling associated with a liquid system are more advantageous in dissipating the disturbance than these attributes, where they exist, would be for a gaseous system. Consequently, safe conditions can be more easily achieved, i.e., larger cells and higher storage temperatures, etc., for a high pressure liquid system than for a high pressure gaseous system.

Storage of the normally explosive material in a liquid state at high pressures has definite advantages not only over a high pressure gas system but over a low pressure liquid system as well. A low pressure liquid system would occur where the temperature is kept low enough to insure a very low vapor pressure. The boiling point of the normally explosive material in the low pressure liquid system is lower than that of the normally explosive material in the high pressure system. Hence, a given temperature profile will dissipate more energy to the container walls per unit of time in the high pressure system than in the low pressure system. Three factors are largely responsible for this. First, a larger fraction of the given temperature profile lies in the highly conductive liquid of the high pressure liquid system than in the low pressure liquid system. Further, conductive heat transfer rates from the high pressure gas of the high pressure system may be in an order of magnitude larger than for the case of a gas in the low pressure system. Finally, the thermal conductivity of supercritical gases is generally much larger than for gases at moderate or low pressure. Each of these factors makes energy dissipation of initiating disturbances easier for a liquid system utilizing high pressures than for a liquid system utilizing low pressures.

Turning now to the drawings, with the above theoretical and practical considerations in mind, there is shown in FIGURE 1, a container generally designated by the numeral 12, comprised of a centrally disposed pressure tight vessel 14 of generally cylindrical configuration. The vessel is maintained by spacers 16 in spaced, generally concentric relationship within a cylindrical outer shell 18 to define therewith a refrigerating compartment 20. Outer shell 18 is provided with a removable upper or cover portion 22 and is totally enclosed by heat and shock insulation 24 which latter, like the shell, includes a removable upper section 26. Materials such as styrofoam and vermiculite are, amongst others, satisfactory for this insulation. The normally explosive material 28 is confined under pressure within the vessel 14, which vessel is compartmented by a plurality of perforate heat transfer panels 30 arranged in honeycomb or grid fashion and extending from top to bottom and from wall to wall of the vessel. A heavy-walled thermally conductive material is preferable for the panels 30 and should be cladded or made up entirely of a material which upon exposure to the normally explosive material is non-reactive and is catalytically inactive with regard to the decomposition of such explosive material at the temperature and pressure contemplated to be maintained within the vessel. Anodized aluminum is particularly satisfactory for handling ozone. It is important that the panels 30 not be perforated to such an extent that their heat conductive function be impaired, for these panels function to eliminate the possibility of spontaneous ignition by conducting heat away from the normally explosive material 28 stored within the cells of the vessel, permitting its subsequent dissipation through the vessel outer wall 32.

Disposed within each of the elongate compartments formed by the honeycomb panels 30 is a packing material 34 which serves to define numerous cells within which the normally explosive material is disposed interiorly of vessel 14. These cells or interstices should be no larger than the quenching distance for the normally explosive material at the temperature and pressure of the vessel. Suitable such diameters for ozone will presently be enumerated. Problems may be presented by cell defining material of irregular geometry. The following article, although directed toward the storage of normally explosive materials in a gaseous state, will be helpful here from a geometrical standpoint in arriving at satisfactory quenching diameters: "Prediction of the Quenching Effect of Various Surface Geometries," A. L. Berlad and A. E. Potter, Jr., appearing in the Fifth Symposium (International) on Combustion, published 1955 by Reinhold Publishing Corporation. Like the honeycomb panels 30 and all other structure contacted by the normally explosive material, it is important that the cell-defining material 34 be both non-reactive and catalytically inactive with regard to the decomposition on the normally explosive material at the temperature and pressure maintained within the vessel. For ozone, aluminum oxide turnings are satisfactory, possessing the above characteristics and being thermally conductive. It is of course important where such turnings are used, that the turnings be quite closely packed to achieve the aforementioned size compatible with the quenching distance required. Although anodized aluminum is suggested as a suitable material, other materials may be used and are disclosed in Patent No. 2,928,529.

The explosive material supply and discharge means for vessel 14 includes a supply conduit 36 which is disposed centrally of the vessel 14 and extends downwardly into the lower half of the vessel. Another conduit 38 communicates with the lower end of vessel 14 serving as a means for withdrawal of the normally explosive material. Each of the conduits 36 and 38 are packed with a porous material 40 of good thermal conductivity. Sintered passivated Monel is particularly suitable for use with ozone, serving to define cells to which the normally explosive material is confined during supply and discharge from vessel 14. These cells and the porous material 40 defining same should satisfy the same requirements as to cell size, material reactivity and catalytic action as pointed out above with regard to cell defining material 34.

Figures 3, 4:
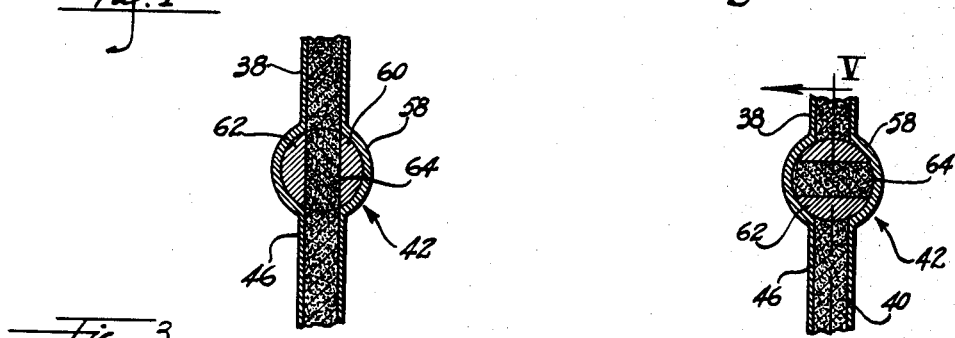
FIGURES 3 and 4 are transverse cross-sectional views of a valve utilized in the apparatus of the invention and respectively showing the valve in open and closed positions.
Figure 5:
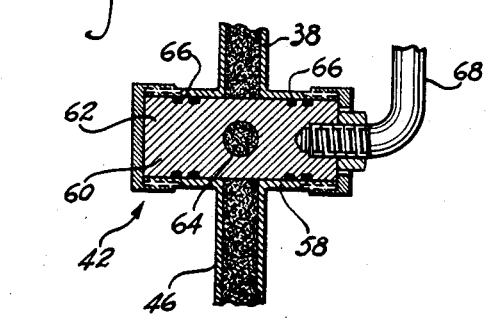
FIGURE 5 is a longitudinal cross-sectional view taken on the line V—V of FIGURE 4 and showing in detail the internal construction of the valve of FIGURES 3 and 4.

Flow in supply and discharge conduits 36 and 38, as well as in certain other areas presently indicated, is under the control of similarly constructed valves 42, shown in detail in FIGURES 3, 4, and 5. The valves permit make-and-break of these conduits with removably coupled transfer conduits 44 and 46. An inspection of FIGURES 1 and 2 will disclose the manner in which the transfer conduits are removably connected to the supply and discharge conduits, with stepped plug portions 48 and 50 of the container heat and shock insulation 24 removable with the transfer conduits. It will further be noted that transfer conduits 44 and 46, like conduits 36 and 38, are internally packed with the porous material 40 and are provided with both cooling means and pressurizing means, such means being typically disclosed schematically in FIGURE 8, for the discharge transfer conduit 46. This transfer conduit cooling means includes cooling conduit 52 for the supply and withdrawal of coolant from a refrigerating compartment (not shown in detail) embracing the conduit and itself totally sheathed in insulation 54. The pressurizing means includes conduits 56, preferably of small diameter or filled with sintered material in accord with the teachings above, each in communication at one end with a pressurizing source (not shown) and at the other end with the interior of transfer conduit 46. It is thus to be noted that a controlled environment has been provided for the normally explosive material both during storage and transfer, a requirement for a safe system.

In FIGURES 3, 4, and 5, a typical transfer valve 42 is shown as comprising a gas-tight cylindrical housing or body portion 58 in communication through diametrically opposed ports with the discharge conduit 38 and the transfer conduit 46. A plug 60 of cylindrical shape is rotably disposed within the housing 58, being comprised of a solid portion 62 and a transversely extending passage portion 64 which latter is packed with the porous material 40, permitting the passage of the normally explosive material 28. Pairs of O-ring seals 66 are disposed at either end of the plug 60, being composed of an inert material, as for example Teflon or fluorocarbon-lubricated silicone rubber. It is of course necessary that all portions of the valve contacted by the normally explosive material be non-reactive therewith and further not catalytically induce decomposition of the normally explosive material. An operating lever 68 is fixedly secured centrally of one end of plug 60 to effect plug rotation and the blockage or opening of conduits 38 and 46 to intercommunication. As illustrated in FIGURE 3, the plug is in an open position; whereas in FIGURE 4 the plug is in a blocking or closed position. Although not shown in detail, the valves 42 positioned in the supply or discharge conduits 36 and 38, FIGURE 1, are arranged such that their housings 58 are cooled by the refrigerant flowing through compartment 20, another indication of total environment control provided for the normally explosive material 28.

Refrigerating means is provided to carry heat away from the outer wall 32 of vessel 14 to maintain the normally explosive material 28 therein below its critical temperature. The refrigerating means includes a refrigeration unit 70, of conventional design, together with a pump 72 which communicates with the refrigerating compartment 20 through the conduit 74. A valve 76 is interposed in conduit 74 for control purposes. A bleed 78 is provided at the upper end of the refrigerating compartment for the purpose of removing refrigerant. A return line (not shown) may be provided to extend from the refrigerating compartment back to the refrigeration unit 70 if a closed circuit system is desired. As heretofore indicated, cooling conduit 52 provides cooling for transfer conduit 46 and is in communication with a suitable refrigeration source or sources (not shown). Although not shown, similar cooling means are provided for transfer conduit 44. The cooling means thus provided for the transfer conduits function in a fashion similar to the vessel cooling system, maintaining the normally explosive material at a temperature lower than critical.

Pressurization of the normally explosive material 28 is provided for through an inert gas pressurizing system utilizing a gas such as helium and comprised of conventional compressor means 80, an accumulator 82, a pump 84 and a linking conduit 86, the latter like conduit 56 preferably being of small diameter or filled with sintered material. Conduit 86 extends into the upper end of vessel 14, being arranged in a series of loops 88 as it passes through refrigerating compartment 20 to provide for cooling of the pressurizing gas prior to its entry into vessel 14. Valves 42 and 90 are provided in the gas supply conduit 86 to control flow. A pressure gage 94 provides an indication of the pressure within vessel 14. As earlier pointed out, it is important that the pressurizing system be capable of imposing a sufficient pressure upon the normally explosive material to maintain it in a safely liquid state.

In FIGURE 6 are shown schematically container 12 and a container 96, the latter similar in construction to container 12 but being maintained at a lower but nevertheless a material-liquefying pressure through a pressurizing source (not shown), with valve 98 being provided to effect pressure regulation. As shown, the containers are arranged for transfer of normally explosive material 28 from one to the other. Container 96 is provided with transfer valves 42 which, like those associated with container 12, are carefully maintained at proper pressure and temperature.

Turning now to FIGURE 6 and a description of the transfer of the normally explosive material ozone from container 12 to container 96, the liquefied ozone 28 is assumed to be stored in vessel 14 at the level indicated. The space above the ozone is occupied by the pressurizing medium, here assumed to be helium gas. Valve 76, FIGURE 1, in the refrigerating conduit 74 and valves 42 and 90 in the pressurizing conduit 86 are open and a safe regime of operating parameters is thereby maintained in the vessel 14. Accordingly, the normally explosive material is maintained safely liquid with the temperature in the vessel 14 below critical and the pressure therein sufficiently high to assure a liquid state for the ozone. Similar conditions are maintained in transfer conduit 46 with valve 99 in the cooling conduit 52 and valves 42 in the pressurizing conduit 56 in open position. The vessel (not shown) which is provided within the container 96 and which is in all respects similar to vessel 14, through utilization of means similar to those provided for said vessel 14 is assumed as maintained at an initial pressurization conveniently lower than vessel 14, but still very high and adequate to assure a liquid state for the ozone. Thus, both of the container vessels are in a safe condition, i.e., within an appropriate parameter regime, as is the remainder of the system including valves and conduits. Valves 42 disposed in and subject to the refrigerating action of the container cooling systems, which valves were initially closed, are now opened to the transfer conduit 46, and valves 90 and 98, FIGURE 6, are utilized to control the pressures within the respective container vessels during transfer. When transfer is completed, these valves 42 will of course be closed and valve 98 will be utilized to bring the vessel of container 96 to the desired storage pressure. Valves 42 in conduit 56 are then utilized as flush control means to permit the dilution of any ozone which may still be present in the transfer conduit 46.

After sufficiently large dilution, i.e., dilution to the point where the normally explosive material may be handled under the ambient conditions present, the transfer conduit may be disconnected from its container interconnecting position of FIGURE 6.

Inasmuch as ozone is generally manufactured at atmospheric pressure in 3 to 6% concentrations and in gaseous form, it is generally necessary at some stage to handle ozone at low pressures. This may be done by distilling ozone at low pressures and temperatures near liquid oxygen temperatures. The distillation is accomplished in small batches. The high concentration ozone which results then is pressurized to a high pressure, again in small batches, and transfer is then effected between two high pressure containers in the manner above described.

With regard to safe dispensation techniques, it should again be emphasized that there must be applied the same criteria and design philosophy which applies to storage of normally explosive material. Hence, the mode of dispensing will vary in details depending upon the concentration of the stored ozone, or other normally explosive material, in its final use.

Two examples may here be appropriate. Firstly, where the use of high concentration ozone is contemplated for the purpose of ozonating drinking water. Ozone in high concentration must be transferred from a safe storage chamber to a water reservoir in which the final ozone concentration will be a fraction of a part per million. Although a variety of techniques are available, the following is satisfactory and illustrative. The technique contemplates the use of a high pressure refrigerated, very low boiling point, inert gas such as helium to flush the ozone-helium mixture (gaseous) out of the storage chamber into a mixing chamber. The mixing chamber is maintained at a very high pressure, but at a pressure lower than that in the storage chamber. The ozone-helium mixture is then bubbled through the water. The ozone is much more soluble in water than the helium. Thus the heavily ozonated water, assumedly somewhat less than 1%, is used possibly continually to ozonate the rest of the water in the reservoir. The helium can then be recovered and reused.

The second case assumes the utilization of high concentration ozone for chemical synthesis in which the ozone is utilized as a reactant to effect oxidation of some organic liquid. A mixture of ozone and the organic liquid may represent a potentially dangerous normally explosive material. In this case the ozone in high concentration is transferred from the storage container to a mixing chamber which, although at high pressure, is at a somewhat lower pressure than the storage container. The mixing chamber is constructed in such a way that it is safe, i.e., in accordance with the foregoing teachings of the invention, and appropriately dilutes the ozone with some inert such as a fluorocarbon. The ozone-inert mixture is then transferred to the reactor to participate in the synthesis. Inasmuch as the organic liquid-ozone-fluorocarbon mixture is still a normally explosive material, the reactor must be designed with this in mind and adequate provisions must be made to establish a safe parameter regime. Of course, sufficient dilution of the inert will make a relatively safe normally explosive material in the reactor, compared with the sensitivity of the high concentration ozone.

In FIGURES 9 and 10 are shown two forms of laboratory test apparatus by means of which the teachings of this invention have been well substantiated. These apparatus (less the ignition means) are accordingly suitable for laboratory retention of normally explosive material, particularly ozone. The highly concentrated ozone stored therein has withstood, without detonation, initiating disturbances many times in magnitude those which would normally trigger a detonation. Further, the cell size geometry determined through use of this laboratory test equipment may be used in determining cells of diameter sufficiently small, i.e., below the quenching distance for the concentrated ozone used in the tests for the particular temperatures and pressures indicated. However it is important in building a large scale system with the cell geometry thus determined that adequate highly thermally conductive grid means be provided to carry away heat from the cells.

In FIGURE 9 the laboratory test and storage apparatus is shown as comprising a Dewar vessel 112 interiorly of which is disposed in spaced relationship with the vessel walls an elongate tubular member 114 which is closed at its lower end and which serves to define the storage cell 116 for the normally explosive material 118, liquid ozone. Member 114 may suitably be made of stainless steel and in its preferred dimensions has a uniform inside diameter of 0.183" and an interior length of 11". Fixed to the base of cell-defining member 114 and extending centrally upward therein is a member 120, in its preferred form of stainless steel and having as preferred dimensions a uniform diameter of 0.156" and a length of 9″. A conduit 122 communicates with the upper end of cell 116 and is provided with a control valve 124. Ignitor leads 126, for which a preferred material is platinum, extend from a source 128 of electrical potential, the leads being substantially immersed in the stored liquid ozone 118, but also having exposed upper portions.

In the test conducted, liquid ozone, at least 99% pure, and with oxygen ($O_2$) as the major impurity, filled the cell 116 to a height of approximately 1″ above the upper end of central member 120. Contained within the cooling space 129, defined intermediate Dewar vessel 112 and cell-defining member 114, was nitrogen which was maintained in liquid form at $-190°$ C. or lower. The system was pressurized at 1,975 p.s.i.a. with helium. Three ignition attempts using 7.4 watts (peak power, approximately 2 joules of energy) were conducted through the ignitor leads 126 without any resulting explosion.

The laboratory test and storage apparatus of FIGURE 10 produced similar results in a number of ignition attempts when substantially pure liquid ozone was stored therein. This apparatus, like that of FIGURE 9, includes a Dewar vessel 130 interiorly of which is maintained a capillary tube 132, in its preferred form of glass and in dimensions approximately 9″ long with a 5.60 mm. outer diameter and a 0.625 mm. inner diameter. The cell 134 thus defined interiorly of tube 132, is of 0.625 mm. inside diameter with a length of approximately 8″. Communicating with the cell interior is a conduit 136 with a control valve 138 interposed therein. Ignitor leads 140, preferably of platinum, extend from an electrical potential ignition source 142 and are substantially immersed in the ozone 144.

The tests of this apparatus were conducted using ozone of at least 99% purity, oxygen ($O_2$) being the major impurity. The ozone substantially filled cell 134. Contained within space 146 intermediate Dewar vessel 130 and capillary tube 132 was liquid nitrogen which substantially encompassed the tube, as indicated. The system was pressurized to 1600 p.s.i.a. with helium. Although 10 attempts were made to ignite the ozone thus stored, no explosion resulted. The peak power dissipation in the ignitor was 8.74 watts and the total energy per ignition attempt was as high as 10 joules. The ignition attempt was thus approximately 10,000 times greater in magnitude than would ordinarily be tolerable for the gaseous case, inasmuch as a millijoule would normally be sufficient to trigger detonation. As a result of the ignition attempts, however, a partial decomposition of the ozone did occur, resulting in oxygen ($O_2$).

From the above, it may be seen that this invention provides an apparatus for the safe storage and handling of highly explosive materials in large and small quantities. Through the practice of its teachings a far greater and more economic use may be made of materials which are of a normally explosive character than is presently possible.

What I claim is:

1. Apparatus for the safe storage and handling of a normally explosive material in its liquid state comprising, in combination, a container insulated against heat and shock, a vessel sealable pressure tight and liquid tight for holding said normally explosive material, said vessel being spaced apart from the wall of said container to define therewith a refrigeration compartment, means for supplying and withdrawing the normally explosive material from said vessel, means for refrigerating said compartment thereby to provide a heat sink for the withdrawal of heat from the walls of the vessel to maintain the normally explosive material within the vessel at a temperature below its critical temperature, means for pressurizing said vessel to a pressure sufficient to maintain the normally explosive material therein in a liquid state, said pressurizing means including a conduit carrying an inert gas pressurizing medium which conduit extends through said refrigeration compartment to subject the pressurizing medium to the cooling action of same prior to entry of the medium into said vessel, heat transfer panels disposed in grid fashion within said vessel to extend laterally and longitudinally thereof to conduct heat from within the vessel to its walls, and packing material disposed intermediate said transfer panels to substantially fill said vessel to define for the receipt of said normally explosive material numerous interstices or cells of no larger diameters than the quenching distance of the normally explosive material at the said temperature and said pressure maintained within said vessel, said packing material, said vessel, and said heat transfer panels exposed to said normally explosive material being substantially non-reactive with said normally explosive material and substantially catalytically inactive with regard to decomposition of the normally explosive material at the said temperature and said pressure maintained within said vessel.

2. Apparatus for the safe storage and handling of a normally explosive material in its liquid state comprising, in combination, a container insulated against heat and shock, a vessel sealable pressure tight and liquid tight for holding said normally explosive material, means for supplying and withdrawing the normally explosive material from said vessel, means for cooling said vessel throughout sufficiently to maintain the normally explosive material therein at a temperature below its critical temperature, means for pressurizing said vessel throughout to a pressure sufficient to maintain the normally explosive material therein in a liquid state, heat transfer panels disposed in grid fashion within said vessel to extend laterally and longitudinally thereof to prevent temperature gradients within the vessel by conducting heat from within the vessel for dissipation to said cooling means, and packing material disposed intermediate said transfer panels to substantially fill said vessel to define for the receipt of said normally explosive material numerous interstices or cells of no larger diameters than the quenching distance of the normally explosive material at the said temperature and said pressure maintained within said vessel, the said packing material, said vessel, and said heat transfer panels exposed to said normally explosive material being substantially non-reactive with said normally explosive material and substantially catalytically inactive with regard to decomposition of the normally explosive material at the said temperature and said pressure maintained within said vessel.

3. Apparatus for the safe storage and handling of a normally explosive material in its liquid state comprising, in combination, a container insulated against heat and shock, a vessel sealable pressure tight and liquid tight for holding said normally explosive material, means for supplying and withdrawing the normally explosive material from said vessel, means for cooling said vessel throughout sufficiently to maintain the normally explosive material therein at a temperature below its critical temperature, means for pressurizing said vessel throughout to a pressure sufficient to maintain said normally explosive material within the vessel in a liquid state, a plurality of heat transfer panels disposed within said vessel, said panels arranged to conduct heat from the vessel interior to prevent temperature gradients within the vessel, and cell defining material disposed intermediate said transfer panels to substantially fill said vessel to define for the receipt of said normally explosive material numerous interstices or cells of no larger diameters than the quenching distance of the normally explosive material at the said temperature and said pressure maintained within said vessel, the said cell defining material, said vessel, and said heat transfer panels exposed to said normally explosive material being substantially non-reactive with said normally explosive material and substantially catalytically inactive with regard to decomposition of the normally explosive material at the said temperature and said pressure maintained within said vessel.

4. The combination of claim 3, wherein said means for the supply and withdrawal of the normally explosive material from said vessel includes conduits communicating therewith and substantially filled with a material sufficiently porous to permit passage of the normally explosive material and having pores of diameters no larger than the quenching distance of the normally explosive material at the temperature and pressure of the said conduits, the said porous material being substantially non-reactive with said normally explosive material and substantially catalytically inactive with respect to its decomposition at the temperature and pressure of the said conduits.

5. The combination of claim 4, wherein said means for the supply and withdrawal of the normally explosive material includes transfer conduits disposed externally of said vessel, means are provided for cooling the interiors of said conduits to temperatures below the critical temperature of the said normally explosive material carried therein, and means are provided for pressurizing said conduit interiors to maintain said normally explosive material in a liquid state.

6. The combination of claim 5, wherein control valves are provided in said means for the supply and withdrawal of the normally explosive material for controlling the flow of the normally explosive material therethrough, the said valves each being comprised of a housing apertured for the passage of said normally explosive material, a plug rotatably disposed within said housing having an impervious blocking portion and a passage portion of a material sufficiently porous to permit passage therethrough of the normally explosive material but having pores no larger than the quenching distance of the normally explosive material at the temperature and the pressure of the said valves, the said valve elements being substantially non-reactive with the said normally explosive material and substantially catalytically inactive with respect to decomposition of said normally explosive material at the temperature and the pressure of said valve, means operably connected to said plug to effect its rotation to bring said passage portion into and out of registry with said apertured portion of said housing thereby to open or close said supply and withdrawal means to the flow of said normally explosive material; and wherein said conduit cooling means includes means for cooling said control valves such that the temperature therewithin is below the critical temperature of the said normally explosive material contacting said valves, the said material accordingly being maintained in a liquid state by said conduit pressurizing means.

References Cited in the file of this patent

UNITED STATES PATENTS

| | | |
|---|---|---|
| 1,230,531 | Stephenson | June 19, 1917 |
| 2,525,802 | Joerren | Oct. 17, 1950 |
| 2,834,187 | Loveday | May 13, 1958 |
| 2,863,297 | Johnston | Dec. 9, 1958 |
| 2,992,540 | Grosse et al. | July 18, 1961 |
| 3,006,153 | Cook | Oct. 31, 1961 |
| 3,069,042 | Johnston | Dec. 18, 1962 |

FOREIGN PATENTS

| | | |
|---|---|---|
| 628,988 | Canada | Oct. 10, 1961 |
| 858,592 | Great Britain | Jan. 11, 1961 |
| 1,248,443 | France | Nov. 7, 1960 |